(12) United States Patent
Paul et al.

(10) Patent No.: US 6,484,699 B2
(45) Date of Patent: Nov. 26, 2002

(54) UNIVERSAL FUEL INJECTION SYSTEM

(76) Inventors: Marius A. Paul, 1120 E. Elm Ave., Fullerton, CA (US) 92631; Ana Paul, 1120 E. Elm Ave., Fullerton, CA (US) 92631

( * ) Notice: Subject to any disclaimer, the term of this patent is extended or adjusted under 35 U.S.C. 154(b) by 0 days.

(21) Appl. No.: 09/801,032

(22) Filed: Mar. 6, 2001

(65) Prior Publication Data

US 2002/0002967 A1 Jan. 10, 2002

Related U.S. Application Data

(60) Provisional application No. 60/190,303, filed on Mar. 12, 2000, and provisional application No. 60/186,967, filed on Mar. 6, 2000.

(51) Int. Cl.[7] .............................................. F02M 21/02
(52) U.S. Cl. ........................ 123/525; 123/526; 239/406; 239/533.3
(58) Field of Search ........................ 123/525; 239/533.7, 239/93, 94, 533.3, 533.12, 406, 407, 408

(56) References Cited

U.S. PATENT DOCUMENTS

| | | |
|---|---|---|
| 5,224,450 A | 7/1993 | Paul et al. |
| 5,299,919 A | 4/1994 | Paul et al. |
| 5,355,856 A | 10/1994 | Paul et al. |
| 5,397,055 A | 3/1995 | Paul et al. |
| 5,632,253 A | 5/1997 | Paul et al. |
| 5,685,272 A | 11/1997 | Paul et al. |
| 5,722,373 A | 3/1998 | Paul et al. |
| 5,806,474 A | 9/1998 | Paul et al. |
| 5,862,373 A | 1/1999 | Paul et al. |
| 6,073,862 A * | 6/2000 | Touchette et al. ........... 239/408 |
| 6,227,823 B1 | 5/2001 | Paul et al. |

* cited by examiner

Primary Examiner—Tony M. Argenbright
Assistant Examiner—Katrina B. Harris
(74) Attorney, Agent, or Firm—Richard Esty Peterson Patent Attorney

(57) ABSTRACT

A universal fuel injection system for liquid and gaseous fuels and mixes thereof the universal fuel injection system having a universal fuel injection module interposed between a liquid fuel injector nozzle the universal fuel injection module having a spring-biased gaseous fuel valve connected to a pressurized gaseous fuel source and to a conical poppet mixing valve in the fuel injector nozzle where liquid fuel from the liquid fuel actuator unit and gaseous fuel selectively admitted through the spring-biased gaseous fuel valve mix for discharge through a fuel nozzle discharge orifice.

9 Claims, 5 Drawing Sheets

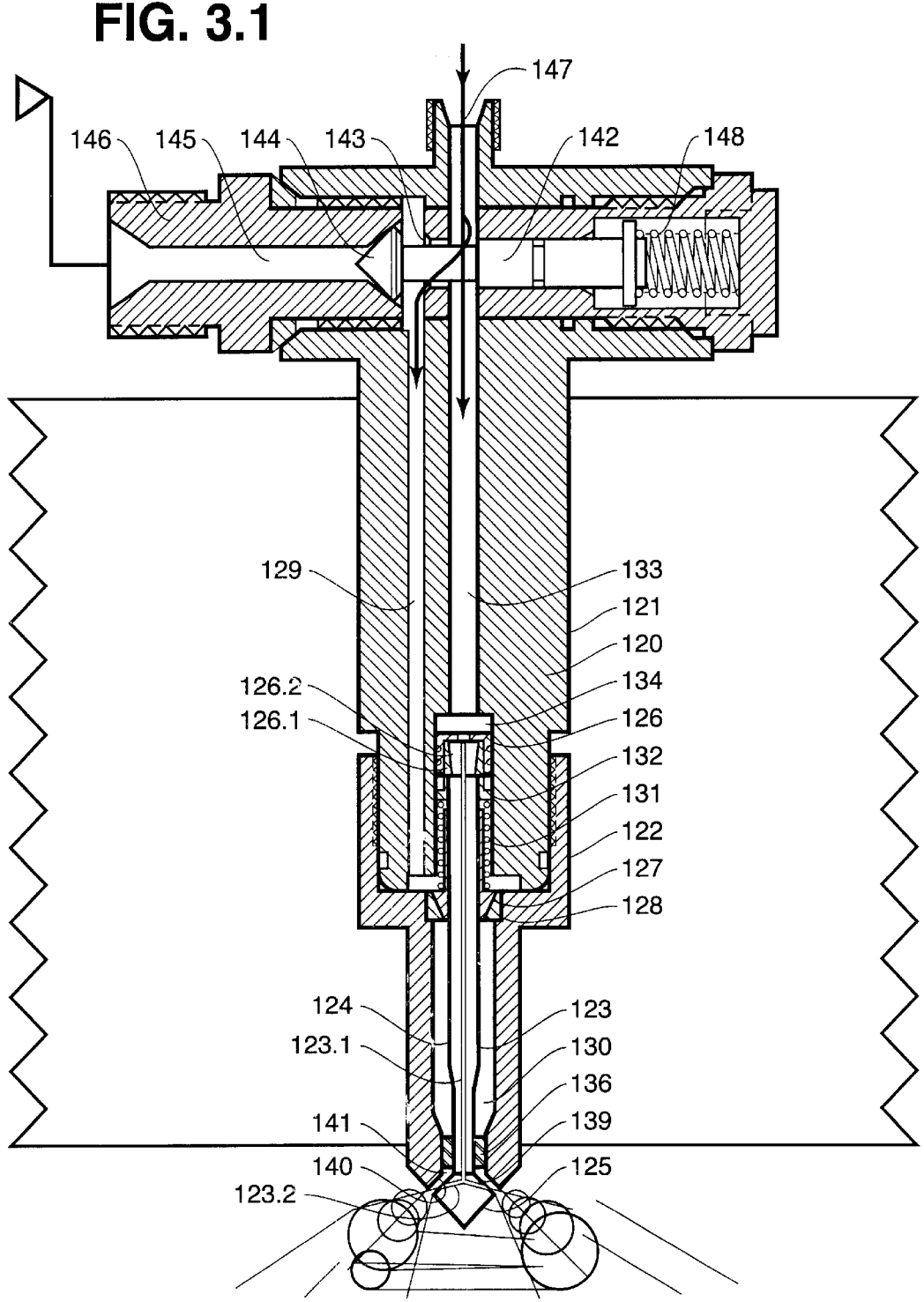
FIG. 3.1

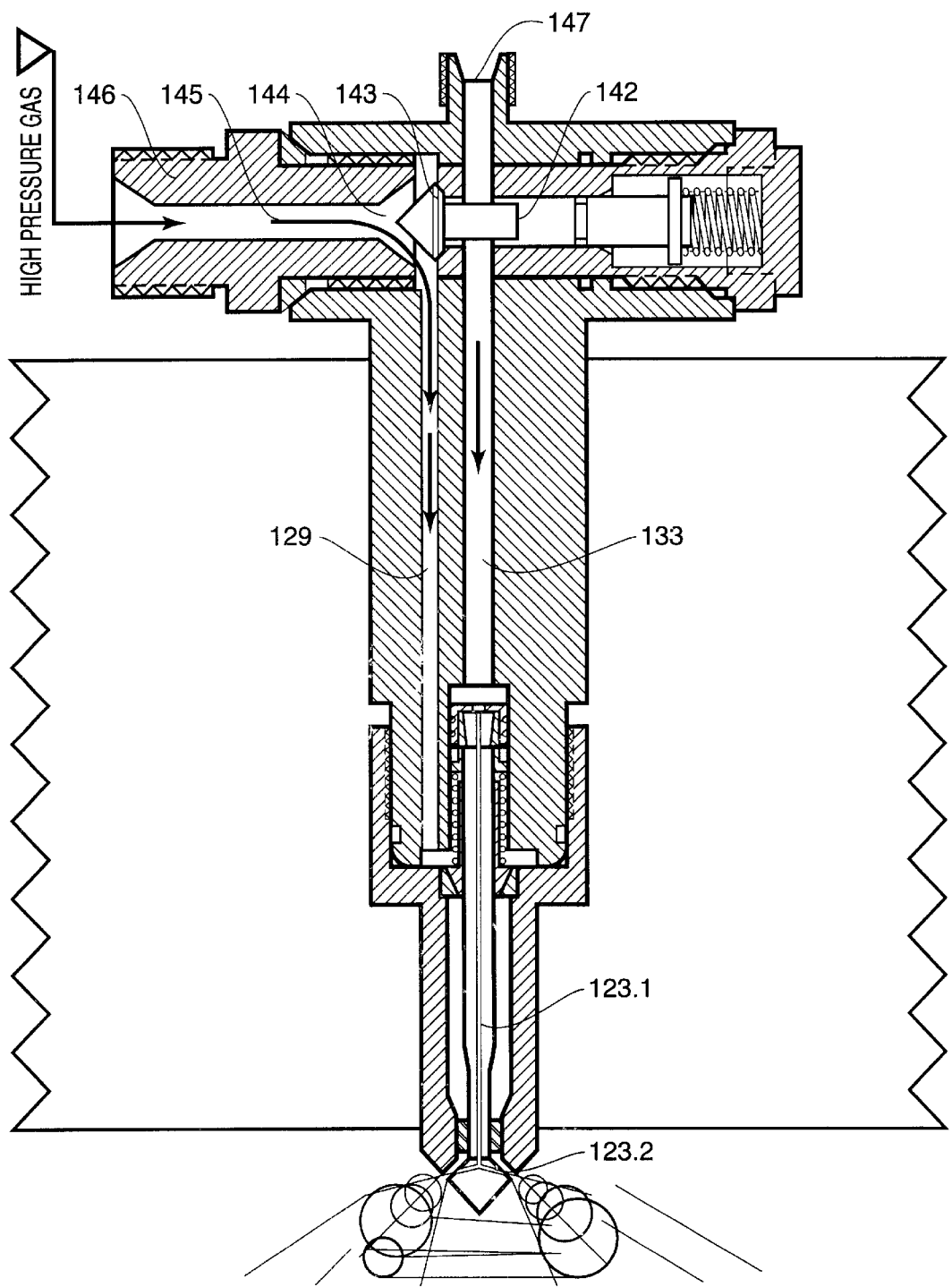
FIG. 3.2

UNIVERSAL FUEL INJECTION SYSTEM

This application claims the benefit of provisional application for Total Energy General Optimized Engine Cycle, Ser. No. 60/190,303 filed Mar. 17, 2000 and provisional application for Universal Fuel Injector System, Ser. No. 60/186,967 filed Mar. 6, 2000, and the subject matter relates to the co-pending application for Total Energy General Optimized Engine Cycle, Ser. No. 09/590,156 filed Jun. 7, 2000 and Self-Injection System, U.S. Pat. No. 5,862,792 issued Jan. 26, 1999.

BACKGROUND OF THE INVENTION

This invention relates to general categories of a fuel injection system which have common configurations and structural arrangements for internal combustion engines. In particular, this invention relates to injector systems which are able to operate using the "self injection" concept, and/or the "common rail" concept, and includes the "multiple injection per cycle" concept, particularly using the concept of "self-induced pulsations." These concepts have been the subject of our prior patented technology. The universal fuel injection system improves upon the prior patented technology and is the main subject of this new invention.

A general attribute that is characteristic of one embodiment using the "universal fuel injection system" and "self-induced multiple injections" is the ability to be associated with and incorporated into any existing or new injection systems.

The general attribute is further enhanced by the modular structure of the preferred implementation which can be flexibly configured for different injection systems, depending on a particular application.

For land transportation, cars, busses, trucks, naval propulsion, locomotives, the main sources of fuel have been liquids, including diesel fuels, kerosene and gasoline, all of them based on petroleum resources.

Natural gas was not sufficiently available to the commercial market for existing vehicles, including more than 600 million, spark ignited and diesel powered vehicles. The conventional, conversion technology, from liquid fuels to natural gas, results in a severe degradation in the performance, resulting in a lower power density and reduced efficiency.

The typical technology, based on the intake of the natural gas and air in a common admission, diminishes the air volume by the gas volume, typically resulting in a 50% reduction of the effective power and thermal efficiency, caused, for example, by the reduction of the compression ratios in a diesel engine from an original 18–20/1 to a resultant 10–11/1.

In contrast, direct injection of the liquid and gas fuels conserves the air capacity and the high compression ratio of the engine for a retained maximum power density and thermal efficiency.

A first objective of this invention is the general and universal capability to directly inject all the liquid fuels, and all the gaseous fuels, like natural gas, compressed natural gas (CNG), or liquefied natural gas (LNG), hydrogen, hydro-ammonia, etc.

A second objective of this invention is the capability that the transition from one fuel to any other can be manual or automatic, or commanded or programmed.

A third objective of this invention is that the universal injector can inject blended fuels from different categories and in different proportions mixing of liquids with liquids, or liquids and gases.

A fourth objective of this invention is the capability to be modularized, integrated and associated on conventional injection systems, on conventional common rails, and in any self-injection system, having the Common Universal Fuel Injector.

A fifth objective of this invention is the universal applicability, with practically insignificant or no modification at all, to any and all categories of engines, whether two stroke, four stroke spark-ignited or four stroke diesel.

A sixth objective of this invention is a constant pressure, direct natural gas injection, using constant pressure natural gas containers, pressurized by liquid fuel injection, with equal volume in accordance with the gas volume injected in the cylinder.

SUMMARY OF THE INVENTION

All the existing injection systems whether conventional, or new, electronically controlled or mechanically actuated, can be fundamentally improved by the association and integration of the universal fuel injector of this invention.

A first embodiment of the "universal fuel injector" is in a working injection system, as described in the referenced patent, where a "self injection system" related to a fuel injection system suitable for any internal combustion engines, wherein the developed pressure within the compression and combustion chamber is utilized to generate the amplified fuel injection pressure.

The new improvement introduces a number of novel features and advantages over and above those already described in the referenced patent for a "self injection system".

The most important feature introduced by these improvements is the "universal fuel injector," which can directly inject any "liquid fuels," of any nature, can directly inject any combination of "liquids with liquid," for example alcohols with petroleum fluids, without the necessity of using surfacents, water and any liquid or gaseous fuels, alternatively can automatically switch to high pressure natural gas CNG and/or LNG, direct injection, as long as the high pressure of the gas is available. Automatically, the universal fuel injector is switched back to liquid fuel injection when or if the high pressure gas is not available, which is permitting the vehicles a continuous operation without any interruption. All these features and advantages are part of the definition of the "universal fuel injection system."

Another essential advantage introduced is the separation between the universal fuel injector module and all the associated injection systems permitting a simple replacement of the existing injector of any engine with the new universal fuel injector module.

A new and specific embodiment of the referenced invention of the "self injection system" is the inclusion of the "universal fuel injector module" in a preferred embodiment of this invention forming a universal fuel, self injection system. The most important advantage introduced by these improvements is the modular separation between all the functional components, like the actuating module, the high pressure injection module and the universal fuel injector module.

This system enables independent control of all the parameters of the injection mixture formation and a perfect clean combustion. The modular system allows flexible structural variations depending on specific applications. Features of the improved injection system, originating in the referenced patent, include a hydraulic cylinder actuating module, with a slidable amplifier piston that is provided with an electronic/hydraulic control valve system, having a commanding plunger that is "hydraulically unbalanced."

This control module controls the access to the source of pressurized actuation fluid over the "hydraulically unbalanced plunger" and is able to control the opening to the source of the pressurized fluid at the start of the injection. The high pressure injection module is provided with an electro hydraulic valve, which controls the general pressurization, and the timing of the "sharp cut" of the end of injection. The same high pressure injection module is preferably provided with the self-induced multiple injection sub-module. Finally, individual modules of the modularized self-injection system described above, or any existing or new injectors, can be associated with the "universal fuel injector module, which is the main object of this invention.

In the type of injection systems featuring the self-injection concept, the compression and the combustion pressure of the gases in the combustion chamber of the engine, on which the injector is mounted, provide the driving pressure for pressurizing the actuation fluid (engine oil or fuel). In this manner, the pressure of the liquid injection fuel, as amplified 10–15 times by the hydraulic actuator, profiles the pressure developed in the combustion chamber. The newly formed injection system directly utilizes the effect of the pressure evolution in the thermal cycle to induce in the fuel injection process a proportional, triangular evolutive pressure, This profile is absolutely ideal for the formation of an air-fuel mixture for a perfect, clean combustion process.

A second embodiment of the invention of this injection system comprises a working injection system, based on the common rail concept, in which the hydraulic pressure source is a medium pressure fuel pump (approx. 4000 psi). This configuration is provided with a balanced electro-hydraulic valve and a common by-pass discharge communication between the hydraulic actuator module and the high pressure injection module.

The new modularized injection system is preferably associated with the described "universal injector module," which is able to direct inject all the categories of liquids and gaseous fuels, individually or combined in any and all proportions, simultaneous or alternatively.

The injection nozzle is provided with a new poppet injection valve, which generates a conic shaped injection spray, equivalent to a nozzle with an infinite number of holes and a high speed vortex generator for spinning the fuel, which generates high intensity centrifugal accelerations of the fuel molecules, producing an explosive dispersion of the fuel and air mixture. This type of fuel injector generates a total homogenization of the fuel air mixture, and is a complete total departure from the non-homogenous fuel mixture of the typical diesel, which is responsible for the usual emission of all the pollutants including NOx and particulate matter.

The universal fuel injector module, which is one of the main features of this invention, is provided with a switch valve for alternately commuting the operation between pure liquid and high pressure gas-liquid, In the direct, high pressure, gas-liquid operation mode, the poppet valve is provided with a central channel for liquid fuel, and a pilot liquid fuel injection holes concentric with the vortex of high speed, high pressure gas directly injected in the combustion chamber. The combined fuels generate a homogenous gas-liquid super mixture, ignited by the liquid-fuel pilot injection.

The universal fuel injector module of this invention can be individually associated and integrated in any and all type of injection systems existing or new, including those with in line injection pumps mechanically driven by the engine, or conventional electronic hydraulic common rail injection systems, which is a "universal characteristic" of this new injection system.

A special category for highly supercharged engines, represented in an alternate embodiment of the self injection system described above, is designed to enable a very large quantity of fuel to be injected in a very short time.

All of these injection systems can be electronically controlled based on an optimized map of operation for all the regimes of power, torque, rotation and level of supercharging. The electronically controlled system utilized modern smart sensors for diagnosing, and continuously comparing the optimized and the real time cycle parameters, cycle by cycle. Such system is controlled by a central electronic module which enables cycle corrections for all potential deviations from the map of optimum conditions.

Since the regulation of any and all the cycle parameters is automatic, the control function of the electronic control module is easily extended over all conditions for each injector. The capability of individual self-control of the injection process for each cylinder enables the system to self-diagnose and to equalize all the factors in an absolute regime of cooperative operation. This result is a self-regulating system for uniform operation of each injector in the entire engine system.

By appropriate modification, the design of the self-injection system can be extended to spark ignited engines for operating lean and ultra lean and clean combustion without departing from the spirit of this invention.

BRIEF DESCRIPTION 0F THE DRAWINGS

FIG. 3.1 is an enlarged view of the universal fuel injector with a schematic view of the liquid fuel alternative operation.

FIG. 3.2 is an enlarged view of the universal fuel injector with a schematic view of the gas-liquid alternative operation.

Figure 1:
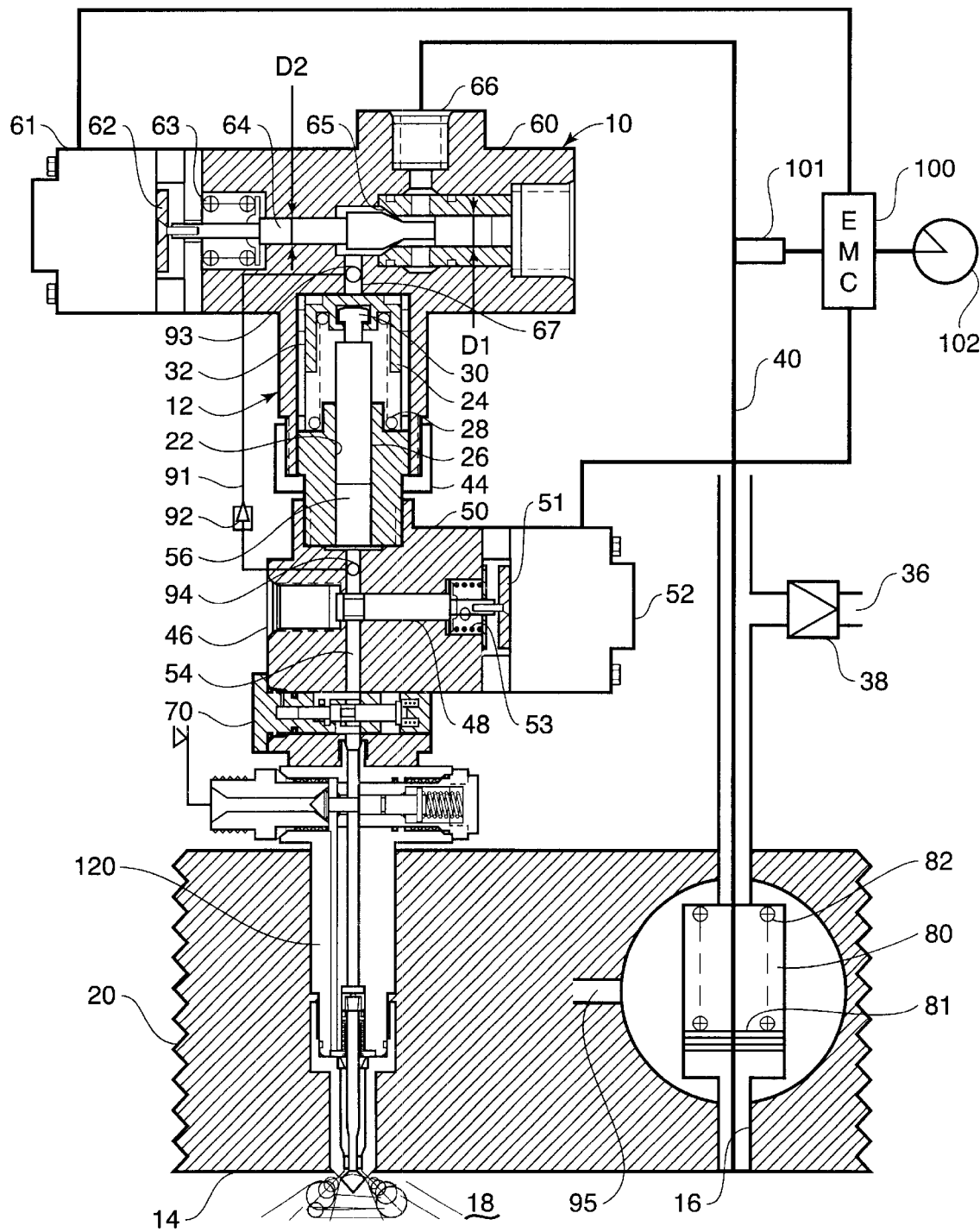
FIG. 1 is a schematic view, partially in cross-sections, of the first embodiment of the universal fuel injection system, having a module structure, utilizing the self-injection concept, with an alternate common rail, multiple injection capability, and the universal fuel injector module.
Figure 4:
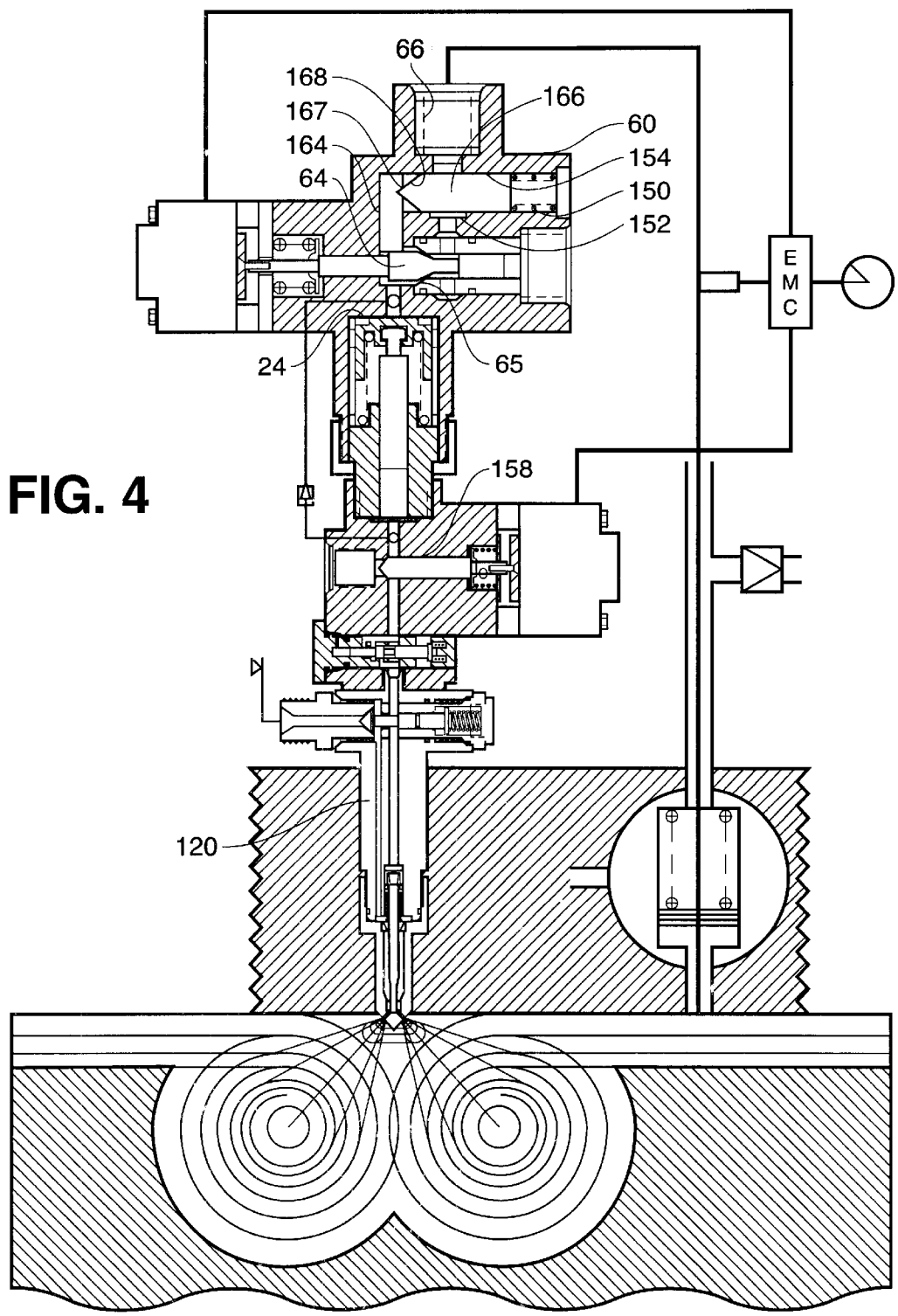

FIG. 4 is a schematic view of an alternate embodiment of the universal injection system of FIG. 1 provided with a self activated by-pass for an increased actuating fuel supply.

DETAILED DESCRIPTION OF THE EMBODIMENTS

The preferred embodiment of the universal fuel injection system of this invention is shown in FIG. 1, designated generally by the reference numeral 10, includes a fuel injector 12, operating alternately on self-injection or common rail, both of which include the sub-module 70 for multiple induced injections. The fuel injection system 10 has a universal fuel injector 120 mounted on an internal combustion engine 14, a portion of 20 of which is shown schematically in FIGS. 1 and 4.

The internal combustion engine 14 is modified to provide a communication passage 16 with the combustion chamber 18 of the engine 14, to provide pressure pulse for the self-injection feature.

In FIGS. 1 and 4 the alternative utilizing the self injection concept has an actuator module 60 with a spool valve 64 having dimensional differential in its diameter (D2/D1) as indicated. The gas communication passage 16 from the combustion chamber 18, to the gas/hydraulic cylinder 80 provides access to the drive medium to displace a free piston 81. The piston displaces against the return bias of a spring 82, to pressurize the actuator fluid that is filled in the cylinder 80, on the top side of the piston. The actuator fluid is in communication with the hydraulic conduit 40 and the supply port 66.

The supply port module 60 of the fuel injection cylinder 22 arranged in conjunction with an actuating cylinder 24. A high pressure injector piston 26 is slidable in the fuel injection cylinder 22, against the bias of a compression spring 28. The injector piston 26 has an end 30 coupled to an enlarged amplifier piston 32 that is slidably engaged in the actuating cylinder 24 against the bias of the compression spring 28. Hydraulic fluid from a hydraulic supply 36 protected by a check valve 38 is fed into the fuel injector unit 12 through hydraulic conduit 40. It is to be understood that the fuel injector system may be utilized in gasoline and diesel engines. In the case of diesel engines, the hydraulic supply is connected with the fuel supply such that the diesel fuel comprises the hydraulic fluid necessary to actuate the injector unit 12.

The fuel injector body includes a central body (actuating module) 44 housing the necessary hydraulic actuator components and is connected with the high pressure injection module 50 housing the fuel supply components that include a fuel intake port 46 controlled by an electro hydraulic valve 48 that is biased to be open by an internal compression spring 53, and closed when attracted by a magnetic plate 51 on the solenoid 52.

Fuel from a source (not shown) is pumped in the injector unit 12 in a conventional manner during the time of the recharging stroke of the injector piston 26 together with the amplifier piston 24 under the retracting force of the spring 28 and the pressure of the supply source.

During the time of recharging, the injector solenoid 52 is de-energized maintaining the electro hydraulic valve 48 open. In this time fuel fills the passage 54 in the central body of the fuel injector unit 12 and the chamber 56 defined by the fuel injector cylinder 22 and the injector piston 26 as it retracts.

On starting of the injection time, the solenoid 52 is energized attracting the magnetic plate 51, which displaces the attached valve 48 to seal the chamber 56 and passage 54. The starting of injection can be decided by the electronic control module 100 from the proper compression pressure for the optimum combustion time based on the indication of the pressure transducer 101 and timing control 102, to energize the solenoids 52 and 61 which actuate the electro hydraulic valves 48 and 64 of the injector.

Controlling the injection by the real condition of the thermal cycle is the best way to optimize the regimes of power and rotation. This is the advantage of a self regulated and optimized injection system.

The effective start of the injection is determined by the action of the supply module 60 upon energizing the solenoid 61 which attract the magnetic plate 62 against the biased compression spring 63 displacing the spool valve 64. The valve port 65 will be open giving the incoming fluid access to the actuating cylinder through the channel 67. The pressure of the actuating fluid coming from the conduit 40 through the port 66 is equal to the actual pressure in the engine compression chamber at the moment the injection starts.

The injection pressure evolution multiplied by the factor of amplification of the 10–15 times in the injection cylinder 22, equivalent to the ratio of the area of the amplifier piston 32 and the area of the injection piston 26.

The end of the injection process is initiated by de-energizing the solenoid 61 which releases the spool valve 64. Because the differential relationship of the diameters in the spool valve 64, where D2/D1, the port 65, remains open during the pressure drop in the conduit 40, resulting from the pressure reduction during the expansion time, as transmitted by the gas hydraulic piston 80, which is returned to its initial position at the beginning of the compression by the spring 82. In this way, all the accumulated energy in the actuating system, including the energy in the springs 28 and 82, will be returned back to the engine cycle during expansion.

Simultaneously with de-energizing solenoid 61, solenoid 52 is de-energized which releases the electro hydraulic valve 48, opening the port 46 to the fuel supply (not shown) producing the actual termination of the injection process in a sharp cut-off manner. No shock wave, no pressure oscillation, no post injection release; only a clean injection and clean combustion results from the process.

It is to be understood that the preferred embodiments of FIGS. 1 and 4 include the gas/hydraulic module 80 for self induced injection. The injection system can be utilized in a conventional "common rail" hydraulic actuation system using a pressurized actuator fluid (fuel or other system fluid) with certain minor modifications.

The gas hydraulic module 80 is eliminated and replaced by a medium pressure pump (not shown) to provide pressurized fluid from a reservoir to a common rail 95 that supplies the plurality of injectors of a typical multicylinder engine. In this alternate arrangement, the spool valve 64 will be hydraulically balanced, i.e. D1=D2. Where the actuator fluid is fuel, as in the typical common rail system, the actuator module 60 has a fluid connection with the injection module 50 through bypass conduit 91 that connects to the actuator channel 67 through port 93 and th the high pressure delivery conduit 54 through port 94. The bypass conduit 91 is protected from backflow by check valve 92.

The electronic control module 100 controls the injection process based upon a pre-programmed map of optimum performance for the system. The common rail alternative includes the multiple induced injections with a sharp cutoff, but a constant pressure.

At the start of injection, solenoid 52 is energized thereby sealing the system. An instant later, solenoid 61 is energized opening the spool valve 64, which is hydraulically balanced with D1=D2. The medium pressure actuator fluid acts on the amplifier piston 32, which amplifies the fluid pressure in the piston cylinder 56 under force of the injector piston 26.

The high pressure fuel produces a pilot injection and instantaneously thereafter the main injection as a result of passing through the sub-module 70 as described.

At the end of injection both modules 50 and 60 are de-energized allowing the amplifier piston to return driving the actuator fluid through bypass 91 to charge the cylinder 56, with any excess returning to the fluid source.

Figure 2:
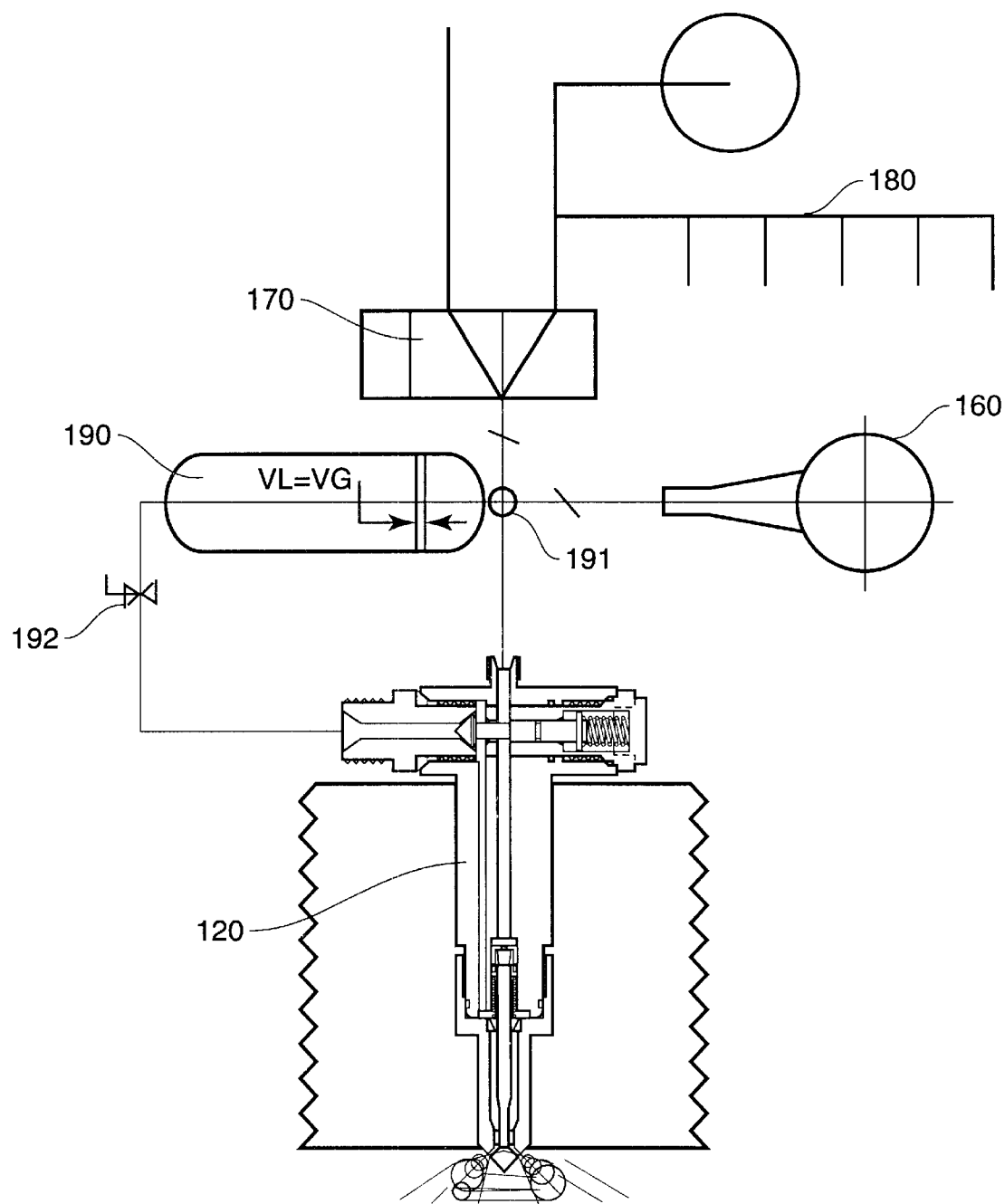
FIG. 2 is a schematic of different injection system alternatives, including new conventional mechanical driven in line injection pump, and existing or new common rail injection systems, which can associate and integrate the "universal fuel injector," and the constant pressure natural gas direct injection system, including a constant pressure container pressurized by liquid fuel injection.

The multiple pulse injection claimed in the referenced patent is integrated in the actual invention in cooperation with the universal fuel injection concept producing a major synergetic effect for a perfect combustion without delay of ignition and reduced emission, especially the reduction of Nox. Depicted in FIG. 2 is the universal adaptability and capability of the universal fuel injector 120 to be associated with any conventional mechanical in-line injection pump, generically indicated by numeral 160, by simply replacing the conventional existing injector with the "universal fuel injector" 120. Instantly,without any structural modification, the engine can run on any fuels, including natural gas CNG and LNG, conserving and improving all the performances of the original engine.

In a similar example, the capability of the universal fuel injector 120 to be associated with any conventional existing common rail injection system, generically indicated by the numeral 180 is demonstrated by using a generic electro-hydraulic valve 170 for triggering the injection process.

For dual fuel operation on direct injection of natural gas that is ignited by a "pilot liquid fuel," a constant pressure natural gas, is pressurized by a parallel injection of an equal volume VL of liquid fuel in the gas container 190, with the same volume VG of the natural gas CNG directly injected in the engine cylinder through valve 192. The distributor device 191 commutes only liquid fuel for direct injection by the universal injector 120, or diverts a "pilot fuel injection" to be directly injected in the cylinder together with the high pressure natural gas by the universal fuel injector 120.

In a similar operation of the common rail system 180, that can directly inject all the liquid fuel, controlled by the generic electro hydraulic valve 170, and the distributor 191, by the universal fuel injector 120; or can divert a VL volume of liquid fuel toward the container 190, and a "pilot injected fuel" through the universal fuel injector 120, and the main volume of gas VG, equal with the volume VL of liquid fuel, is directly injected together by the universal fuel injector 120.

By permanent equality of the volume of the gas VG=VL with the volume of liquid fuel, the pressure in the gas container is maintained constant creating permanent conditions for direct injection of the natural gas and the pilot fuel in the engine combustion chamber.

In FIG. 3.1 there is depicted an enlarged view of the universal fuel injector 120, which comprises the injector module for the universal fuel injector system 10 operating on liquid fuel. The universal fuel injector 120 has a main body 121, and a nozzle 122. The main body 121 connects to the high pressure injector module 50 at one end and to the injector nozzle 122 at the other end. Within the injector nozzle 122 is a poppet valve 123 with the valve stem 124 being provided with a central channel 123.1 and pilot holes 123.2 located on the seat of the conical poppet head 125 of the poppet valve 123 at one end, and, at the other end, an enlarged piston head 126, capturing lock 126.1 of the stem head 126.2. The valve stem 124 is dis placeable in a stem guide 127 having radial slots 128 to allow fuel to flow from a supply conduit 129 to a nozzle plenum 130. The poppet valve 123 is biased to close by the compression spring 131 seated on the stem guide 127 and retained by a spring retainer 132 fixed to the valve stem 124. The conical poppet valve 123 has a conical seating shoulder 139 that seats on the conical seat 140 with the angle of the conical shoulder matching the angle of the conical seat.

Hydraulic actuator fluid (in this instance liquid fuel) contained in the central conduit 133 contacts the piston head 126 in a piston chamber 134 and, upon sufficient pressurization, displaces the poppet valve 123 as limited by the contact of the retainer 132 with the stem guide 127. When displaced as shown in FIG. 3.1, the poppet head 125 allows fluid to pass from the injector 120 through the uniform flared gap 141. A fluted vortex guide 136 attached to the poppet valve 123 at the end of the nozzle section 122 of the injector imparts a strong directional rotation to the emitted conical spray.

As centrifuged by the vortex guide 136, the high velocity emitted spray appears to generate millions of rotations of the injected fuel inducing enormous centrifugal dispersing forces on the fuel molecules for total homogenization of the fuel mixture. Because this process is repeated by the multiple induce pulsation injection described in the referenced patent, the super dispersion of the fuel molecules creates the supreme mixture possible for any fuel, and by definition a perfection in clean homogenization of the combustion.

This liquid fuel operation is created by the double access of the liquid fuel through the central conduit 133 and the main conduit 129 that is permitted by the upper position of the switch valve 142 and the open passage 143. In this upper position the poppet head 144 closes the conduit 145 inside of the connector 146. This upper positioning of the switch valve 142 results from the bias of the spring 148. Through the connection 147 the universal fuel injector is connected with the source of the high pressure fuel.

In FIG. 3.2 there is depicted the universal fuel injector module 120 with the universal fuel injector operating in the "gas-liquid mode" by the pushed down position of the switch valve 142 by the high pressure of the natural gas coming from the source CNG which opens the conduit 145, and closes the passage 143. The result is the access of the CNG in the conduit 129 and the liquid fuel is restricted to the central passage for supplying the "pilot injection" through the central conduit 133 and 123.1 and the pilot holes 123.2. The direct injection of the high pressure gas CNG and the high pressure liquid fuel pilot in the seat and vortex channel produces a perfect gas-liquid mixed spray and a supreme final air-fuel mixture.

In FIG. 4, an alternate embodiment of the injector system is shown. Here the actuator module 60 for the universal fuel injector 120 includes the components as previously described with the addition of a by-pass channel 164 protected by a poppet valve 166, with a seating end 167 urged toward the valve orifice 168 by a compression spring 150. The supply port 66 initially provides access to the valve 65 through an enlarged section 152 of the poppet valve cylinder 154. When the electronically controlled spool valve 64 is opened allowing pressurized actuating fluid to flow to the actuating cylinder 24, back pressure against the seating end 147 of poppet valve 166 then displaces the valve against the spring 150 and opening the karge orifice 168. The surge of pressurized actuating fluid acts on the amplifier piston 32 to generate a forceful and instantaneous driving pulse for actuating the injection. To facilitate a rapid cut-off at the end of injection, an enlarged cut-off valve 158 is provided to match the high flow system described for a rapid response system utilizing the by-pass poppet valve 166.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. In a fuel injector system having a liquid fuel injector with a liquid fuel actuator unit and an injector nozzle that injects fuel into an engine cylinder, a universal fuel injector system comprising:

a universal fuel injection module interposed between the liquid fuel actuator unit and the injector nozzle, the injector module having a spring biased gaseous fuel valve with a displacement poppet and a conduit connection to a source of pressurized gaseous fuel, and a conical poppet mixing valve in the injector nozzle having a passage connected to the liquid fuel actuator unit and a passage connected to the gaseous fuel valve, and control means for selecting one of a liquid fuel from the liquid fuel actuator unit and a liquid-gaseous fuel in part from the liquid fuel actuator unit and in part from the gaseous fuel source through the spring biased gaseous fuel valve, wherein on selection of the liquid-gaseous fuel, a pilot liquid fuel pulse displaces the poppet of the gaseous fuel valve releasing a charge of gaseous fuel through the gaseous fuel passage to the poppet mixing valve where it mixes with the pilot liquid fuel pulse.

2. A universal fuel injection system for selectively injecting fuel from a liquid fuel source in a liquid fuel mode and a combined liquid fuel from the liquid fuel source and gaseous fuel from a high pressure gaseous fuel source in a combined liquid-gaseous fuel mode into an engine cylinder comprising:

a liquid fuel actuator unit and a universal fuel injector connected to the liquid fuel actuator unit, the universal fuel injector having an injector nozzle with a conical poppet mixing valve and a gaseous fuel switch valve interposed between the liquid fuel actuator unit and the injector nozzle, the switch valve of the universal fuel injection having a displaceable spring biased poppet head and a conduit with a passage connected to the high pressure gaseous fuel source, wherein the spring biased poppet head is biased to close the passage of the conduit in the liquid fuel mode and open the passage in the combined liquid-gaseous fuel mode, and control means for selecting one of a liquid fuel from the liquid fuel actuator unit and a liquid-gaseous fuel in part from the liquid fuel actuator unit and in part from the gaseous fuel source through the spring biased gaseous fuel valve, where on selection of the liquid-gaseous fuel, the poppet head of the switch valve is displaced and a pilot liquid fuel pulse displaces the conical poppet mixing valve releasing a charge of gaseous fuel through the passage to the poppet mixing valve where it mixes with the pilot liquid fuel pulse before injection into the engine cylinder.

3. The universal fuel injection system of claim 2 wherein the poppet valve has a valve stem with a central channel and a conical poppet head with pilot holes wherein the pilot liquid fuel pulse passes liquid fuel through the central channel and pilot holes.

4. The universal fuel injection system of claim 3 wherein the injector nozzle has a conical seat and the conical poppet valve has a matching conical shoulder that seats on the conical seat, wherein the pilot holes pass through the conical shoulder and are blocked when the conical shoulder of the poppet valve seats on the conical seat of the injector nozzle.

5. The universal fuel injection system of claim 4 comprising further a main fuel conduct for gaseous or liquid fuel, the main fuel conduit communicating with a plenum in the injector nozzle wherein on displacement of the conical poppet valve a flared gap is formed between the conical shoulder of the poppet valve and the conical seat of the nozzle for passage of the gaseous or liquid fuel with the liquid fuel of the pilot liquid fuel pulse.

6. The universal fuel injection system of claim 5 wherein the injector nozzle has a vortex guide at the end of the plenum wherein fuel from the main fuel conduct is centrifuged before discharge through the flared gap.

7. The universal fuel injection system of claim 5 wherein the switch valve has a passage from the liquid fuel actuator to the main fuel conduit and wherein displacement of the gaseous fuel switch valve by high pressure gaseous fuel opens the passage from the high pressure gaseous fuel source to the main fuel conduit and blocks the liquid fuel passage from the liquid fuel actuator the main fuel conduit.

8. The universal fuel injection system of claim 7 wherein the poppet head of the switch valve blocks the liquid fuel passage to the main fuel conduit when operating in liquid-gaseous fuel mode.

9. The universal fuel injection system of claim 8 wherein the gaseous fuel source has a gaseous fuel container and the liquid fuel actuator injects a volume of liquid fuel into the container equal to the volume of gaseous fuel discharged to the universe fuel injector when operating in liquid-gaseous fuel mode, wherein high pressure in the container is maintained.

* * * * *